United States Patent [19]

Lewis et al.

[11] Patent Number: 4,730,960

[45] Date of Patent: Mar. 15, 1988

[54] FLEXIBLE SOCKET EXTENSION

[76] Inventors: Wilbur Lewis, 109 Wilkens Rd., Fayetteville, Ga. 30214; David F. Aberin, P.O. Box 386, Keno, Oreg. 97627-0386

[21] Appl. No.: 941,776

[22] Filed: Dec. 15, 1986

[51] Int. Cl.[4] .......................... B23B 47/02; B25B 23/00

[52] U.S. Cl. ...................................... 408/127; 81/177.6

[58] Field of Search ............ 408/127; 81/176.6, 177.7, 81/177.75, 57.27

[56] References Cited

U.S. PATENT DOCUMENTS

| | | | |
|---|---|---|---|
| 1,866,714 | 7/1932 | King | 408/127 |
| 1,903,660 | 4/1933 | Smith et al. | 81/177.6 |
| 3,399,584 | 9/1968 | Lewicki | 81/177.6 |
| 3,585,885 | 6/1971 | Carr | 81/177.6 |
| 4,029,428 | 6/1977 | Levens | 408/127 |

FOREIGN PATENT DOCUMENTS

| | | | |
|---|---|---|---|
| 217368 | 6/1924 | United Kingdom | 81/177.6 |
| 490643 | 11/1975 | U.S.S.R. | 81/177.6 |

*Primary Examiner*—Gil Weidenfeld
*Assistant Examiner*—Daniel W. Howell
*Attorney, Agent, or Firm*—Robert B. Stevenson

[57] ABSTRACT

A flexible extension tool for use with a conventional socket and ratchet wrench or the like comprising a helically wound flexible cable with end caps and rotatable conventional male and female connectors extending therefrom wherein the extension tool can be manually held in a highly bent configuration as a plurality of tongue and grooved cylindrical elements confined to the interior of the flexible housing spin therein during use thus transmitting torque. Each element consists of a cylindrical cross-sectional member with a centrally positioned radial groove at one end and an orthogonal centrally positioned radial curved tongue at the other end and a plastic washer or ring spacer positioned circumferentially thereon and coaxial to the helically wound flexible cable, thus partially occupying the annular space between the helically wound flexible cable and torque transmitting element resulting in smooth, low friction transmission of applied torque.

2 Claims, 6 Drawing Figures

FLEXIBLE SOCKET EXTENSION

BACKGROUND OF THE INVENTION

1. Field of the Invention

This invention relates to an improved flexible socket extension tool. More specifically, the invention relates to a flexible socket extension that is driven by a ratchet wrench or the like and can be bent to conform to any arbitrary angle and manually held in the bent configuration during use.

2. Description of the Prior Art

The concept of employing an extension between a conventional ratchet wrench and a socket is well known and a common practice. The use of such combination of hand tools frequently involves the need to compensate for an off-set or curvature during use. To achieve this end, swivel joints and/or flexible extensions have been employed with limited success in that either the prior art hand tools are limited in terms of angle of deflection, ease of use, lack of stability (i.e., tendency to straighten out during use) or a combination thereof.

SUMMARY OF THE INVENTION

The present invention provides an improved flexible extension tool capable of being bent through a complex curve and manually held in such a configuration during use comprising:

(a) a hollow helically wound flexible cable;

(b) a pair of end caps wherein one of the end caps is operatively attached to one end of the flexible cable and the other end of the end caps is attached to the other end of the flexible cable and wherein one end cap has an opening therein colinear with the interior of the flexible cable;

(c) a plurality of essentially identical, operatively interconnected torque transmitting elements within the flexible cable wherein each of the elements consists of a cylindrical cross-sectional element with curved surface and centrally positioned radial groove means at one end and an orthogonal centrally positioned radially curved tongue means at the other end wherein the tongue means is adapted to operatively fit into the groove means thus completing a flexible sequence of torque transmitting elements free of any attachment linkage;

(d) a plurality of plastic ring spacer means, wherein each of the plurality of torque transmitting elements contain at least one of the plastic ring spacer means externally surrounding and radially extending beyond the cylindrical cross-sectional element such as to partially occupy the annular space between the hollow helically wound flexible cable and the torque transmitting elements such as to allow smooth, low friction transmission of applied torque;

(e) a female connector means passing through the opening in one of the end caps and operatively engaged to the flexible sequence of torque transmitting elements within the flexible cable and wherein a female connector is adapted to engage to and be driven by a conventional ratchet wrench; and (f) a male connector means passing through the opening in the other of the end caps and operatively engaged to the other end of the flexible sequence of torque transmitting elements within the flexible cable and wherein the male connector is adapted to engage to and drive a conventional socket.

Thus, it is an object of the present invention to provide a reliable flexible extension useful with conventional ratchet wrench or the equivalent drive mechanism to transmit torque to a conventional socket or the equivalent driven tool. It is a further object of the present invention to provide such a flexible extension that transmits the torque through a flexible stationary housing without experiencing any significant frictional losses or tendency to resist the curvature present in the extension tool during use. Fulfillment of these objects and the presence and fulfillment of additional objects will be apparent upon complete reading of the specification and claims taken in conjunction with the attached drawings.

DESCRIPTION OF THE PREFERRED EMBODIMENTS

Figure 1:
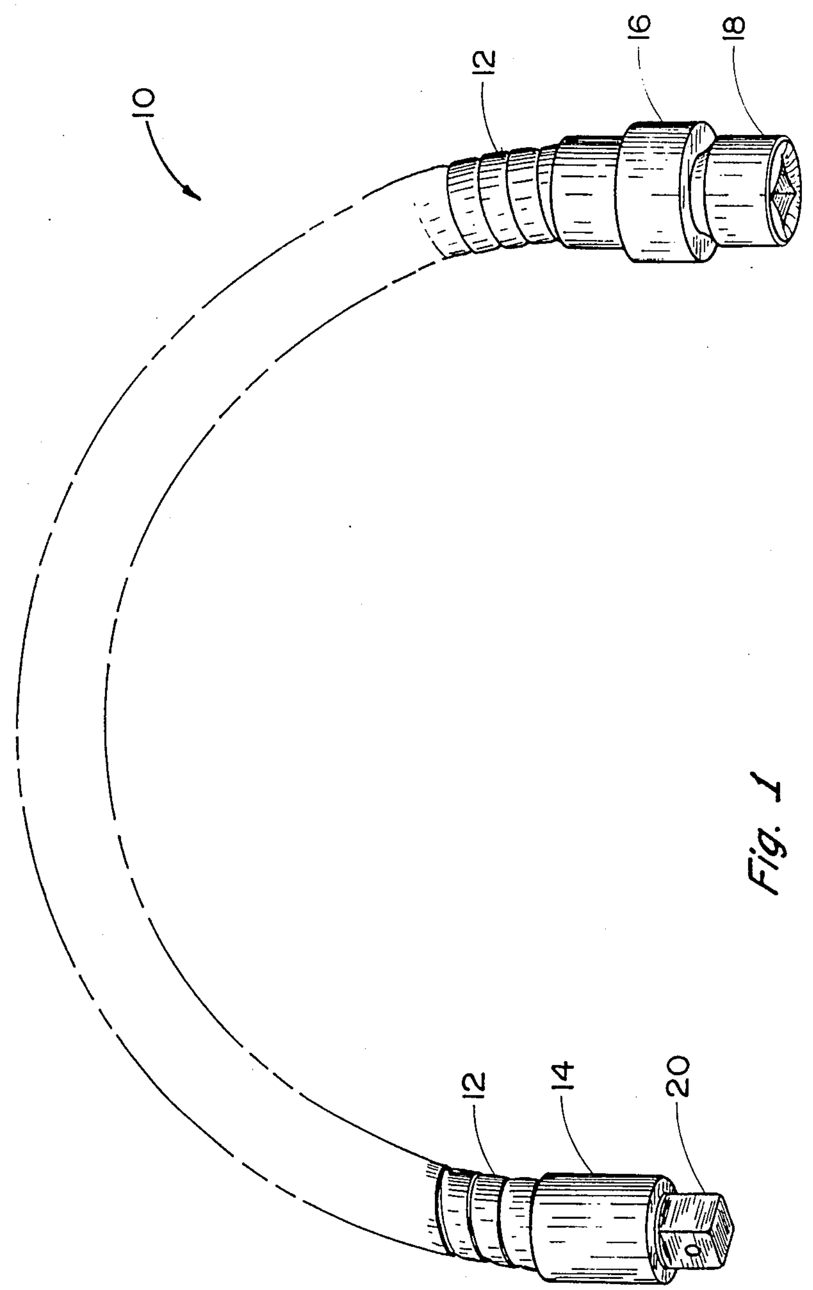
FIG. 1 is a partial silhouetted perspective view of a flexible extension tool according to the present invention.

The improved flexible extension tool according to the present invention, how it is made and used and how it differs from the prior art devices can perhaps be best explained and understood by reference to the drawings. FIG. 1 illustrates in a semi-silhouetted form the flexible extension tool according to the present invention, generally designated by the numeral 10. As suggested in FIG. 1, the extension tool can be bent through a severe angle (e.g., 180 degrees), yet the tool can be physically held in such a position during use. This is accomplished by virtue of the flexible housing 12 with end caps 14 and 16 being rotatably independent of the female driven connector 18 and the male drive connector 20 of the extension tool 10. In other words, the transmission of torque in the improved flexible extension tool of the present invention is not accomplished via the helically wound flexible housing 12 nor is it necessary for the housing 12 and end caps 14 and 16 to spin during use. In contrast to the prior art extension tools, the housing 12 of the present invention can be manually held, thus stabilizing the tool during use without effecting the desired transmission of torque. Further and as previously indicated, the extension tool according to the present invention is specifically designed to transmit applied torque without significant frictional losses and with reduced tendency to resist the bend or curvature (i.e., reduce tendency to straighten out) during use.

Figure 3:
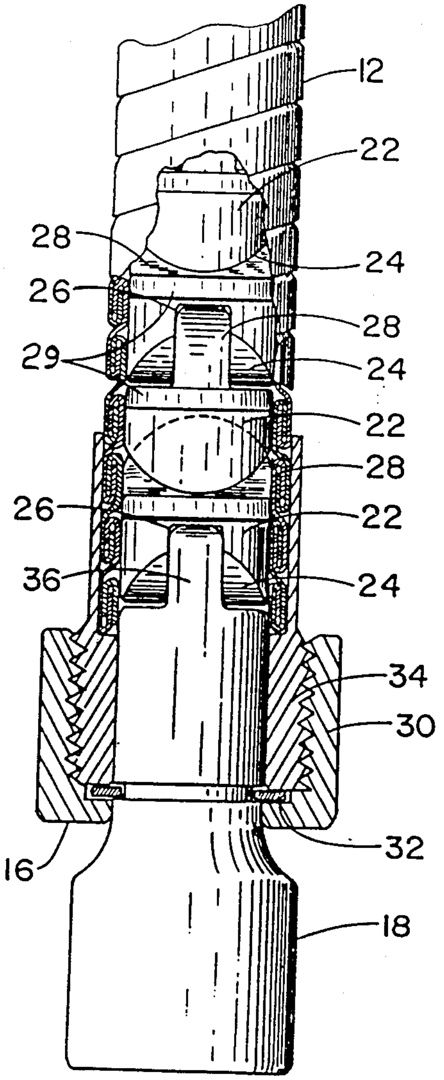
FIG. 3 is a partial cut-away of the other end of the flexible extension tool of FIG. 1.
Figure 2:
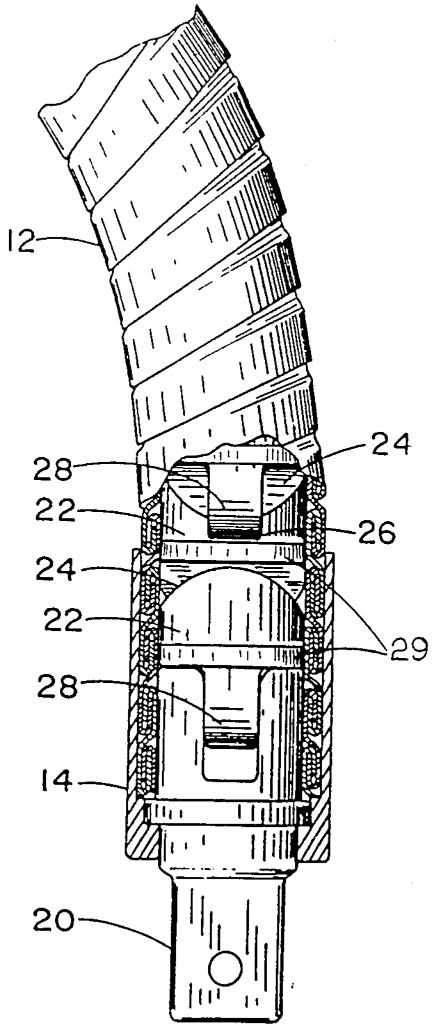
FIG. 2 is a partial cut-away view of one end of the flexible extension tool of FIG. 1.

As shown in the partial cut-away views of FIGS. 2 and 3, the actual transmission of torque in the present invention is by virtue of a plurality of interlocking yet independent elements 22 confined to the interior of the flexible cable or housing 12. Each element 22 is cylindrical in cross-section such as to swivel freely within the flexible housing. At one end of each element 22 is a circular curved surface 24 with a radial groove 26 centrally located. At the other end of each element 22 is a centrally located circular tongue element 28 that inserts into the groove 26 of the next element 22. As further illustrated, the groove 26 on one end of element 22 is perpendicular (orthogonal) to the tongue element 28 on the other end of the same element. As such, the sequence of elements can twist and bend arbitrarily in any direction, yet the tongue and groove will remain interconnected, thus the entire core or sequence of elements 22 spin as a single torque transmitting means, yet the individual elements 22 are free of any physical attachment linkage.

Figure 4:
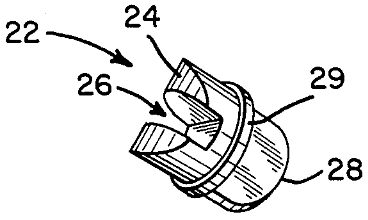
FIG. 4 is a perspective view of the tongue and groove torque transmitting element according to the present invention with the annular plastic spacer positioned circumferentially on the cylindrical body of the element.
Figure 5:
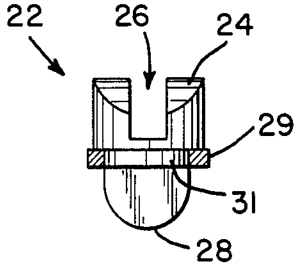
FIG. 5 is a partial cross-sectional view of the torque transmitting element of FIG. 4 as seen looking lengthwise through the groove and perpendicular to the tongue and showing the annular plastic spacer in cross-section.
Figure 6:
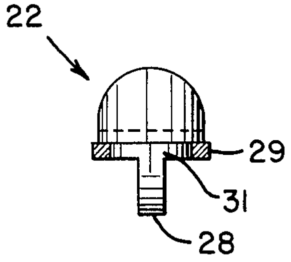
FIG. 6 is a partial cross-sectional view of the torque transmitting element of FIG. 4 looking lengthwise along the tongue and perpendicular to the groove and again showing the annular plastic spacer in cross-section.

Surrounding the cylindrical body of each element 22 is a centrally positioned plastic washer or ring spacer 29. The plastic ring spacer 29 extends radially slightly beyond the circumference of the element 22 (see FIGS. 4 through 6) and as such, partially occupies the annular space formed between the flexible housing 12 and the series of tongue and groove interlocked elements 22 (see FIGS. 2 and 3). As shown in FIGS. 4 through 6, the plastic washer or ring spacer 29 can be conveniently mounted circumferentially to the cylindrical body of element 22 by providing a recessed ledge 31 at the base of the tongue 28 positioned essentially mid-way on the cylindrical body of element 22. Conveniently, the sides of the tongue 28 can be reduced to the internal diameter of the ring washer 29 (the outer diameter of the ledge 31) such that the ring washer 29 can be slipped over the tongue and onto the ledge. It should be appreciated that various other methods and configurations or positioning one or more plastic washers or ring spacers on the body of each element can be employed according to the present invention and as such, the present invention should not be interpreted as being unduly limiting.

As further illustrated in FIG. 2, the end cap 14 attached to one end of the flexible cable or housing 12 contains a male socket drive connector 20 which in this specific embodiment engages to the tongue element 28 of the last of the sequence of torque transmitting elements 22. It should be appreciated that the tongues and grooves can be interchanged, thus the male socket drive connector could terminate internally as a tongue rather than a groove and the remaining elements within the flexible housing or cable would be turned around.

FIG. 3 illustrates the internal structure of the other end of the flexible extension tool 10. As shown, the end cap 16 consists of two pieces that thread together to allow for assembly of the tool. The outer component 30 of end cap 16 has the female connector 18 inserted through an opening in the end cap 16 and is retained by snap ring 32. The outer component 30 then threads to the inner component 34, thus forcing the tongue element 36 at the inner end of the female connector 18 into operative engagement with the groove 26 of the first torque transmitting element 22. Again, it should be appreciated that the role of the tongue and groove can be interchanged and so can the roles of the threaded end caps and nonthreaded caps and/or both end caps can be threaded such as to be assembled/disassembled from either end of the cable. In this manner, the physical turning of the female connector 18 by use of a ratchet wrench, breaker bar, speed wrench, torque wrench or the like results in the sequence of interconnected elements 22 forcing the male connector 20 at the other end of the extension tool 10 to spin and thus, deliver torque to the socket or the like attached thereto. Since the housing 12 and end caps 14 and 16 are independent of the torque transmission, the entire tool can be bent or twisted in complex curves and manually held in such position as the socket or the like is being driven by application of torque at the wrench end. It has been found that the presence of at least one plastic washer or spacer ring on each element reduces friction and enhances the ability of the series of elements to transmit torque, while the cable or flexible housing is held in a bent or twisted configuration.

To manufacture and assemble the improved extension tool according to the present invention, the components are to be made from any tool grade steel or the like as generally known in the art. The helically wound housing or exterior sheath can be made from any such flexible material, again, as generally known in the art. The plastic washer or ring spacer can be made out of any generally known low friction plastic including, by way of example, but not limited thereto, various nylons and polyamides, polyimides or polyamide/imides, various thermoplastics such as polyformaldehyde, polypropylene, polyethylene, polytetrafluoroethylene and other fluorinated polymeric materials, polyvinyl chloride and the like. Preferably, a polyformaldehyde thermoplastic such as DELRIN is employed. To assemble the tool, the cable is either threaded, crimped, glued, welded or the like to the end cap after the appropriate male or female connector is in place and similarly attached to the inner component of the threadably assembled end cap. The other connector can then be inserted through the opening of the outer component of the threadedably assembled end cap and a snap ring or the equivalent is then used to hold them in place. An appropriate plurality of tongue and groove elements are then inserted into the interior of the housing with swivel action to completely fill the interior and finally, the threaded end cap with connector is tightened onto the end of the flexible tool completing the assembly.

Having thus described the invention with a certain degree of particularity, it is manifest that many changes can be made in the details of the invention without departing from the spirit and scope of the invention. Therefore, it is to be understood that the invention is not limited to the embodiments set forth herein for purposes of exemplification, but is to be limited only by the scope of the attached claims, including a full range of equivalents to which each element thereof is entitled.

I claim:

1. A flexible extension tool comprising:

(a) a hollow helically wound flexible cable;

(b) a pair of end caps wherein one of said end caps is operatively attached to one end of said flexible cable and the other of said end caps is attached to the other end of said flexible cable and wherein one end cap has an opening therein colinear with the interior of said flexible cable;

(c) a plurality of essentially identical, torque transmitting elements within said flexible cable wherein each of said elements consists of a cylindrical cross-sectional element with curved surface and centrally positioned radial groove means at one end and an orthogonal centrally positioned radially curved tongue means at the other end wherein said tongue means is adapted to operatively fit into said groove means thus completing a flexible sequence of torque transmitting elements free of any attachment linkage;

(d) a plurality of plastic ring spacer means, wherein each of said plurality of torque transmitting elements contain at least one of said plastic ring spacer means externally surrounding and radially extending beyond said cylindrical cross-sectional element such as to partially occupy the annular space between said hollow helically wound flexible cable and said torque transmitting elements such as to allow smooth, low friction transmission of applied torque;

(e) a female connector means passing through the opening in one of said end caps and operatively engaged to said flexible sequence of torque transmitting elements within said flexible cable and wherein said female connector is adapted to engage to and be driven by a conventional ratchet wrench; and (f) a male connector means passing through the opening in the other of said end caps and operatively engaged to the other end of said flexible sequence of torque transmitting elements within said flexible cable and wherein said male connector is adapted to engage to and drive a conventional socket.

2. A flexible extension tool of claim 1 wherein one of said end caps further comprises an inner threaded component and an outer threaded component threadably engaged such as to allow for assembly and disassembly of said flexible extension tool.

* * * * *